(12) United States Patent
Kondo

(10) Patent No.: US 10,085,260 B2
(45) Date of Patent: Sep. 25, 2018

(54) WIRELESS BASE STATION, WIRELESS COMMUNICATION SYSTEM, NODE, CONTROL METHOD, AND PROGRAM

(71) Applicant: NEC Corporation, Tokyo (JP)

(72) Inventor: Takayuki Kondo, Tokyo (JP)

(73) Assignee: NEC Corporation, Tokyo (JP)

( * ) Notice: Subject to any disclaimer, the term of this patent is extended or adjusted under 35 U.S.C. 154(b) by 28 days.

(21) Appl. No.: 15/102,610

(22) PCT Filed: Dec. 5, 2014

(86) PCT No.: PCT/JP2014/006092
§ 371 (c)(1),
(2) Date: Jun. 8, 2016

(87) PCT Pub. No.: WO2015/087527
PCT Pub. Date: Jun. 18, 2015

(65) Prior Publication Data
US 2016/0316471 A1    Oct. 27, 2016

(30) Foreign Application Priority Data
Dec. 9, 2013    (JP) .................................. 2013-253831

(51) Int. Cl.
*H04W 72/04* (2009.01)
*H04W 72/12* (2009.01)
*H04W 72/08* (2009.01)

(52) U.S. Cl.
CPC ... *H04W 72/0453* (2013.01); *H04W 72/1247* (2013.01); *H04W 72/048* (2013.01); *H04W 72/087* (2013.01)

(58) Field of Classification Search
CPC ........... H04W 72/0453; H04W 72/048; H04W 72/087; H04W 72/1247
See application file for complete search history.

(56) References Cited

U.S. PATENT DOCUMENTS

| 8,792,923 B2* | 7/2014 | Kato | ................ H04W 72/0453 |
| | | | 455/452.1 |
| 2003/0031201 A1* | 2/2003 | Choi | ..................... H04W 72/04 |
| | | | 370/468 |

(Continued)

FOREIGN PATENT DOCUMENTS

| JP | 2003-070053 A | 3/2003 |
| JP | 2003-536287 A | 12/2003 |

(Continued)

OTHER PUBLICATIONS

International Search Report corresponding to PCT/JP2014/006092, dated Feb. 17, 2015, 1 page.

(Continued)

*Primary Examiner* — Mohamed Kamara
(74) *Attorney, Agent, or Firm* — Wilmer Cutler Pickering Hale and Dorr LLP

(57) ABSTRACT

In order to make it possible to preferentially allocate stable wireless bands to prescribed users, this wireless base station is provided with the following: a storing means that stores guaranteed wireless bands in association with identifying information for wireless terminals, said guaranteed wireless bands being wireless bands that can be preferentially allocated to said wireless terminals and are computed on the basis of wireless bands that the wireless base station had allocated to said wireless terminals in the past; and a controlling means that controls the wireless base station so as to preferentially allocate wireless bands to the wireless terminals until the guaranteed wireless bands.

5 Claims, 10 Drawing Sheets

(56) References Cited

U.S. PATENT DOCUMENTS

| | | | | |
|---|---|---|---|---|
| 2003/0041088 | A1* | 2/2003 | Wilson | G06F 9/4411 |
| | | | | 718/104 |
| 2005/0213503 | A1* | 9/2005 | Guo | H04L 47/15 |
| | | | | 370/230 |
| 2008/0056134 | A1 | 3/2008 | Ohsako et al. | |
| 2011/0003599 | A1* | 1/2011 | Kanzaki | H04W 72/08 |
| | | | | 455/452.2 |
| 2012/0300662 | A1* | 11/2012 | Wang | H04W 72/02 |
| | | | | 370/252 |
| 2014/0369217 | A1* | 12/2014 | Kim | H04W 16/12 |
| | | | | 370/252 |
| 2015/0173099 | A1* | 6/2015 | Sun | H04W 72/10 |
| | | | | 370/336 |

FOREIGN PATENT DOCUMENTS

| | | |
|---|---|---|
| JP | 2008-060804 A | 3/2008 |
| JP | 2008-283491 A | 11/2008 |
| JP | 2009-171535 A | 7/2009 |
| JP | 2013-038574 A | 2/2013 |
| JP | 2013-183228 A | 9/2013 |
| WO | WO-2012/147206 A1 | 11/2012 |

OTHER PUBLICATIONS

Written Opinion corresponding to PCT/JP2014/006092 with English translation, dated Feb. 17, 2015, 5 pages.
Japanese Office Action issued by the Japan Patent Office for Japanese Application No. 2015552327 dated Jun. 27, 2017 (5 pages).

\* cited by examiner

| IDENTIFICATION INFORMATION OF UE | GUARANTEED WIRELESS BAND |
|---|---|
| ID#1 | 10Mbps |
| ID#2 | 10Mbps |
| ID#3 | 5Mbps |
| ID#4 | 3Mbps |
| ID#5 | 2Mbps |
| ⋮ | ⋮ |

Fig. 6

| NUMBER OF TIMES | GUARANTEED WIRELESS BAND $Y_{m,n}$ | ALLOCATED WIRELESS BAND $X_{m,n}$ | APPLY TO EQUATION FOR CALCULATION |
|---|---|---|---|
| 1 | | 10Mbps | |
| 2 | 10.00Mbps | 5Mbps | $Y_{m,2}=10$ |
| 3 | 9.95Mbps | 8Mbps | $Y_{m,3}=0.01*5+0.99*10.0$ |
| 4 | 9.93Mbps | 15Mbps | $Y_{m,4}=0.01*8+0.99*9.95$ |
| 5 | 9.98Mbps | $X_{m,5}$ | $Y_{m,5}=0.01*12+0.99*10.0$ |

| IDENTIFICATION INFORMATION OF UE | GUARANTEED WIRELESS BAND | NUMBER OF TIMES OF ACCESSES | PREFERENTIAL ORDER |
|---|---|---|---|
| ID#3 | 5Mbps | 83 | 1 |
| ID#2 | 10Mbps | 62 | 2 |
| ID#1 | 10Mbps | 54 | 3 |
| ID#4 | 3Mbps | 37 | 4 |
| ID#5 | 2Mbps | 31 | 5 |
| ⋮ | ⋮ | ⋮ | ⋮ |

| IDENTIFICATION INFORMATION OF UE | GUARANTEED WIRELESS BAND | NUMBER OF TIMES OF ACCESSES | PREFERENTIAL ORDER |
|---|---|---|---|
| ID#3 | 5Mbps | 30 | 1 |
| ID#6 | 8Mbps | 14 | 2 |
| ID#10 | 3Mbps | 13 | 3 |
| ID#7 | 12Mbps | 11 | 4 |
| ID#5 | 2Mbps | 9 | 5 |
| ⋮ | ⋮ | ⋮ | ⋮ |

AM7:00-8:00

| IDENTIFICATION INFORMATION OF UE | GUARANTEED WIRELESS BAND | NUMBER OF TIMES OF ACCESSES | PREFERENTIAL ORDER |
|---|---|---|---|
| ID#1 | 10Mbps | 27 | 1 |
| ID#5 | 2Mbps | 21 | 2 |
| ID#3 | 5Mbps | 20 | 3 |
| ID#8 | 15Mbps | 18 | 4 |
| ID#6 | 8Mbps | 15 | 5 |
| ⋮ | ⋮ | ⋮ | ⋮ |

AM8:00-9:00

| IDENTIFICATION INFORMATION OF UE | GUARANTEED WIRELESS BAND | NUMBER OF TIMES OF ACCESSES | PREFERENTIAL ORDER |
|---|---|---|---|
| ID#2 | 10Mbps | 42 | 1 |
| ID#4 | 3Mbps | 27 | 2 |
| ID#1 | 10Mbps | 25 | 3 |
| ID#9 | 4Mbps | 20 | 4 |
| ID#3 | 5Mbps | 18 | 5 |
| ⋮ | ⋮ | ⋮ | ⋮ |

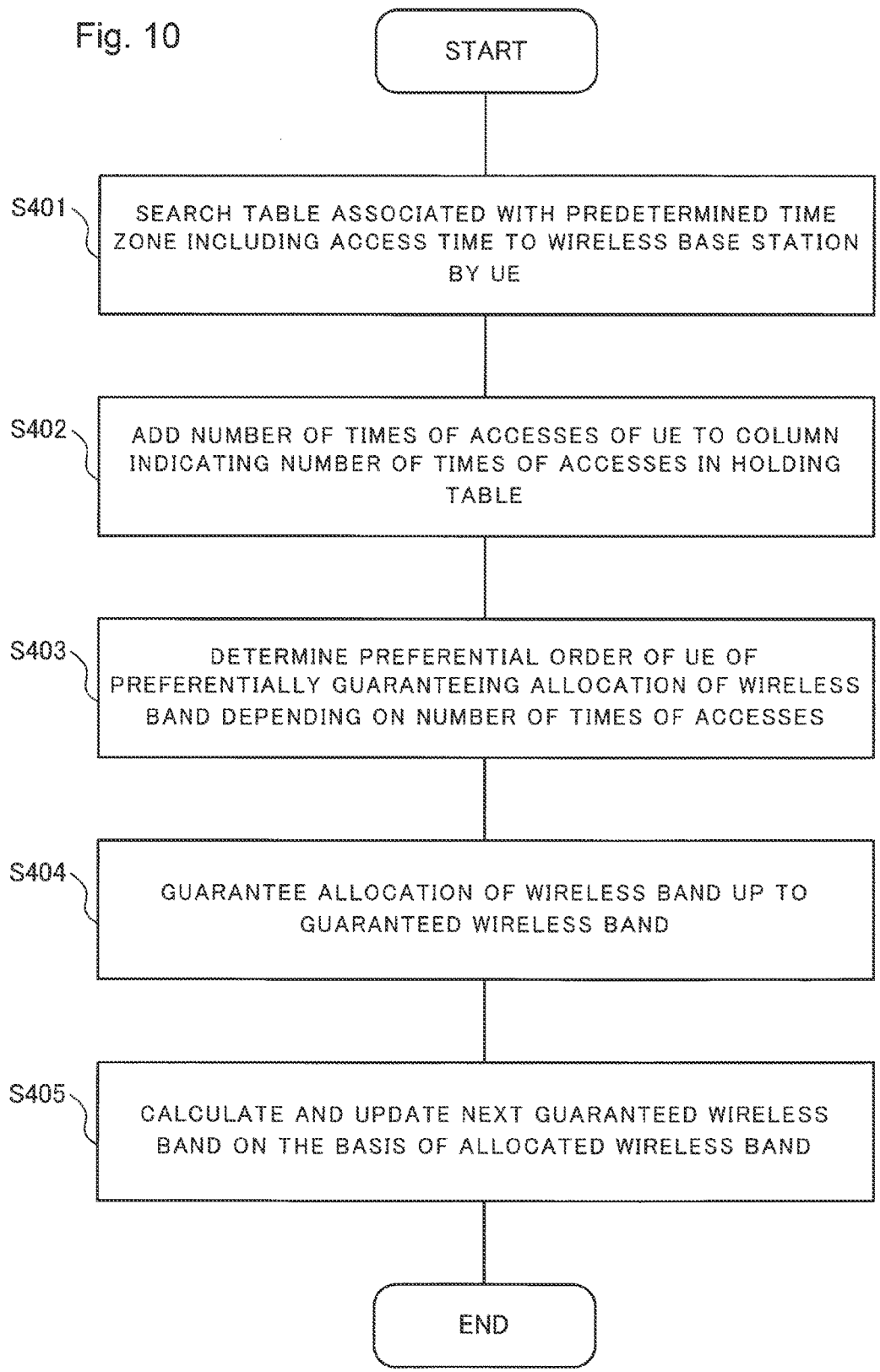

WIRELESS BASE STATION, WIRELESS COMMUNICATION SYSTEM, NODE, CONTROL METHOD, AND PROGRAM

CROSS-REFERENCE TO RELATED APPLICATIONS

This application is a national stage application of International Application No. PCT/JP2014/006092 entitled "WIRELESS BASE STATION, WIRELESS COMMUNICATION SYSTEM, NODE, CONTROL METHOD, AND PROGRAM," filed on Dec. 5, 2014, which claims the benefit of the priority of Japanese Patent Application No. 2013-253831 filed on Dec. 9, 2013, the disclosures of each of which are hereby incorporated by reference in their entirety.

TECHNICAL FIELD

The present invention relates to a wireless base station, a wireless communication system, a node, a control method, and a program.

BACKGROUND ART

In a wireless communication network, a wireless base station transmits data received from a node connected via a predetermined network to a wireless terminal (UE) using radio resources such as a frequency or a time. In carrying data on radio resources, a scheduler provided in a wireless base station performs a process called scheduling. Note that the "UE" is an abbreviation of "User Equipment".

A PF (Proportional Fairness) method and a Max-CIR (Max-Carrier to Interference Ratio) method are known as representative examples of a scheduling method of radio resources in a wireless base station.

A feature of the PF method is that a ratio of an average value of throughputs and instantaneous value thereof are calculated for each user or for each radio bearer, and radio resources are not allocated unless the instantaneous throughput is significantly excellent as compared with throughputs in the past, even when the instantaneous throughput is good (e.g. PTL 1).

Likewise, a feature of the MAX-CIR method is that radio resources are allocated to users in the order from a user having a largest ratio of receiving signal power to power of noise and interference (e.g. PTL 2).

CITATION LIST

Patent Literature

[PTL 1] Japanese Laid-open Patent Publication No. 2008-283491
[PTL 2] Japanese Laid-open Patent Publication No. 2009-171535
[PTL 3] International Laid-open Patent Publication No. 2012/147206

SUMMARY OF INVENTION

Technical Problem

The PF method and the Max-CIR method, as representative methods among the existing scheduling methods, depend on a wireless environment of each user at different occasions. Therefore, wireless bands to be allocated from a wireless base station may change. Thus, it was difficult to allocate stable wireless bands to users.

In view of the above, an object of the present invention is to provide a wireless base station that can preferentially allocate stable wireless bands to predetermined users.

Solution to Problem

To solve the problem mentioned above, according to the invention, a wireless base station, which performs wireless communication with the wireless terminal, comprises:

a holding means which holds a guaranteed wireless band in association with identification information of a wireless terminal, the guaranteed wireless band being a wireless band calculated on the basis of a wireless band allocated to the wireless terminal by the wireless base station in the past, and preferentially allocatable to the wireless terminal; and a control means which controls to preferentially allocate, to the wireless terminal, a wireless band up to the guaranteed wireless band.

Further, a communication system, according to the invention, comprises a wireless terminal, a wireless base station which performs wireless communication with the wireless terminal, and a node to be connected to the wireless base station via a network, wherein the node receives, from the wireless base station, a wireless band allocated to the wireless terminal by the wireless base station in the past, calculates a guaranteed wireless band which is a wireless band preferentially allocatable to the wireless terminal on the basis of the wireless band allocated in the past, and notifies the calculated guaranteed wireless band to the wireless base station, and the wireless base station holds the guaranteed wireless band received from the node in association with identification information of the wireless terminal, and controls to preferentially allocate, to the wireless terminal, a wireless band up to the guaranteed wireless band.

Further, according to the invention, a node to be connected to the wireless base station, which performs wireless communication with the wireless terminal, via a network, receives, from a wireless base station, a wireless band allocated to a wireless terminal by the wireless base station in the past, calculates a guaranteed wireless band which is a wireless band preferentially allocatable to the wireless terminal on the basis of a wireless band allocated in the past, and notifies the calculated guaranteed wireless band to the wireless base station.

Further, according to the invention, a method for controlling a wireless base station, which performs wireless communication with the wireless terminal, comprises:

controlling to preferentially allocate a wireless band to a wireless terminal up to a guaranteed wireless band which is a wireless band preferentially allocatable to the wireless terminal, and is calculated on the basis of a wireless band allocated to the wireless terminal in the past by the wireless base station.

Further, a program, according to the invention, causes a computer to execute a method for controlling a wireless base station, which performs wireless communication with the wireless terminal, wherein the method for controlling the wireless base station, in which a control is performed to preferentially allocate, to a wireless terminal, a wireless band up to a guaranteed wireless band being a wireless band preferentially allocatable to the wireless terminal, the guaranteed wireless band being calculated on the basis of a wireless band allocated to the wireless terminal by the wireless base station in the past.

Advantageous Effects of Invention

According to the present invention, it is possible to provide a wireless base station that can preferentially allocate stable wireless bands to predetermined users.

BRIEF DESCRIPTION OF DRAWINGS

FIG. 6 is a table illustrating calculation examples of guaranteed wireless bands according to the second exemplary embodiment.

FIG. 9 is a diagram illustrating an example of holding tables according to a fourth exemplary embodiment.

FIG. 10 is a diagram illustrating a flowchart according to the fourth exemplary embodiment.

DESCRIPTION OF EMBODIMENTS

Figure 1:
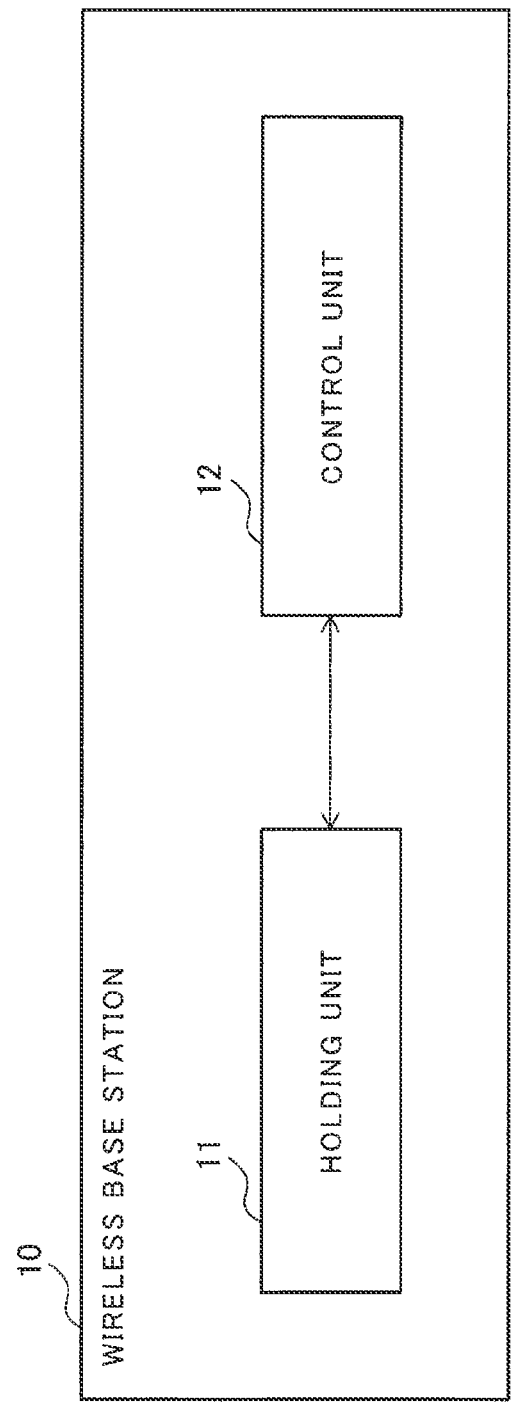
FIG. 1 is a diagram illustrating a configuration of a wireless base station according to a first exemplary embodiment.

In the following, exemplary embodiments for implementing the present invention are described referring to the drawings.

First Exemplary Embodiment

FIG. 1 is a diagram illustrating an example of a configuration of a wireless base station 10 according to the first exemplary embodiment. In FIG. 1, the wireless base station 10 includes a holding unit 11 as a holding means, and a control unit 12 as a control means. Note that the wireless base station 10 is capable of wirelessly communicating with unillustrated UEs. Further, the wireless base station 10 is also communicatively connected to an unillustrated core network.

FIG. 1 illustrates only the constituent elements particularly associated with the exemplary embodiment among the functional blocks included in the wireless base station 10. Specifically, although not illustrated, the wireless base station 10 includes functional blocks for causing the wireless base station 10 to function as a wireless base station.

Figures 2, 3:
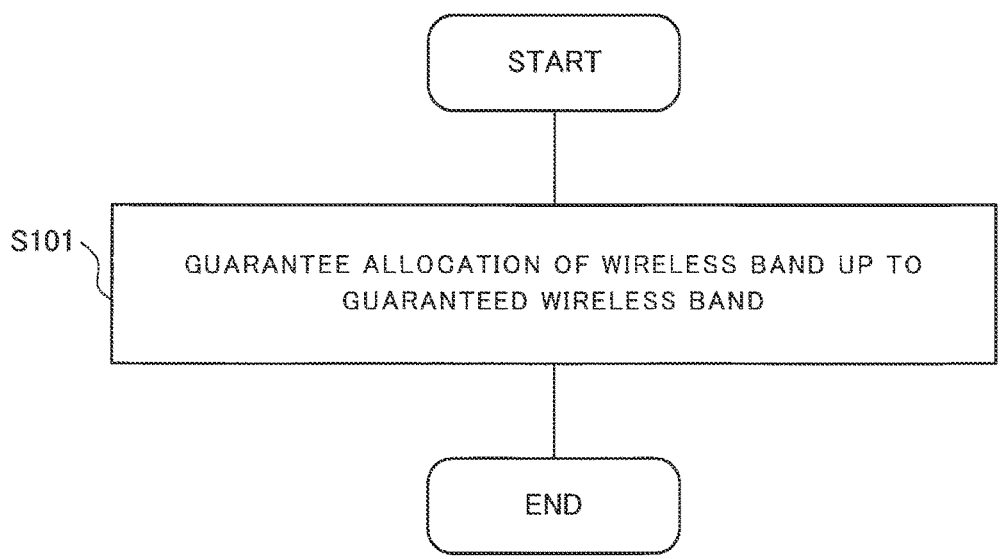
FIG. 2 is a diagram illustrating an example of a holding table according to the first exemplary embodiment.
FIG. 3 is a diagram illustrating a flowchart according to the first exemplary embodiment.

The holding unit 11 of the wireless base station 10 holds a value of a guaranteed wireless band, which is a wireless band calculated on the basis of a wireless band allocated to a UE by the wireless base station 10 in the past in association with identification information of the UE (FIG. 2).

Note that a wireless band is a data transmission rate per unit time in a wireless section. Generally, data transmission in a wireless section is performed by transmitting data using radio resources. The radio resources are resource blocks, sub-frames, resource elements, and the like for the wireless communication system of an LTE (Long Term Evolution) system. The resource block is a minimum unit of allocation of radio resources in a frequency direction. Further, the sub-frame is a minimum unit of allocation of radio resources in a time direction. Further, the resource element is an element constituting a resource block, and is a base unit to be modulated individually.

Further, a wireless band allocated to a UE is a wireless band allocated at a predetermined interval. Furthermore, the predetermined interval is, for instance, a predetermined time interval, or an interval from the time when a UE starts wireless communication until predetermined data communication is terminated.

In addition, a wireless band allocated to a UE in the past means a wireless band allocated by the wireless base station 10 prior to the time when a wireless band is allocated to the UE, and is a wireless band at one or more predetermined intervals.

Calculation of a guaranteed wireless band may be performed by various methods. For instance, a wireless band allocated to a UE immediately before by the wireless base station 10 may be used as a guaranteed wireless band itself. Further, an average value of wireless bands allocated to a UE in the past for several times may be calculated as a guaranteed wireless band.

Note that a wireless band to be allocated may not always have a fixed value during a predetermined interval.

Therefore, from a viewpoint of providing stable services to users, it is desirable to calculate a guaranteed wireless band on the basis of a peak rate of a wireless band allocated in a predetermined interval. The calculation, however, is not limited to the above. For instance, from a viewpoint of reducing wasteful consumption of radio resources in a wireless section, a guaranteed wireless band may be calculated on the basis of an average value of a wireless band allocated in a predetermined interval.

Further, in the present exemplary embodiment, a guaranteed wireless band calculated on the basis of a wireless band allocated to a UE is used. Alternatively, it is possible to use a guaranteed wireless band calculated on the basis of a wireless band actually used by a UE.

Figure 4:
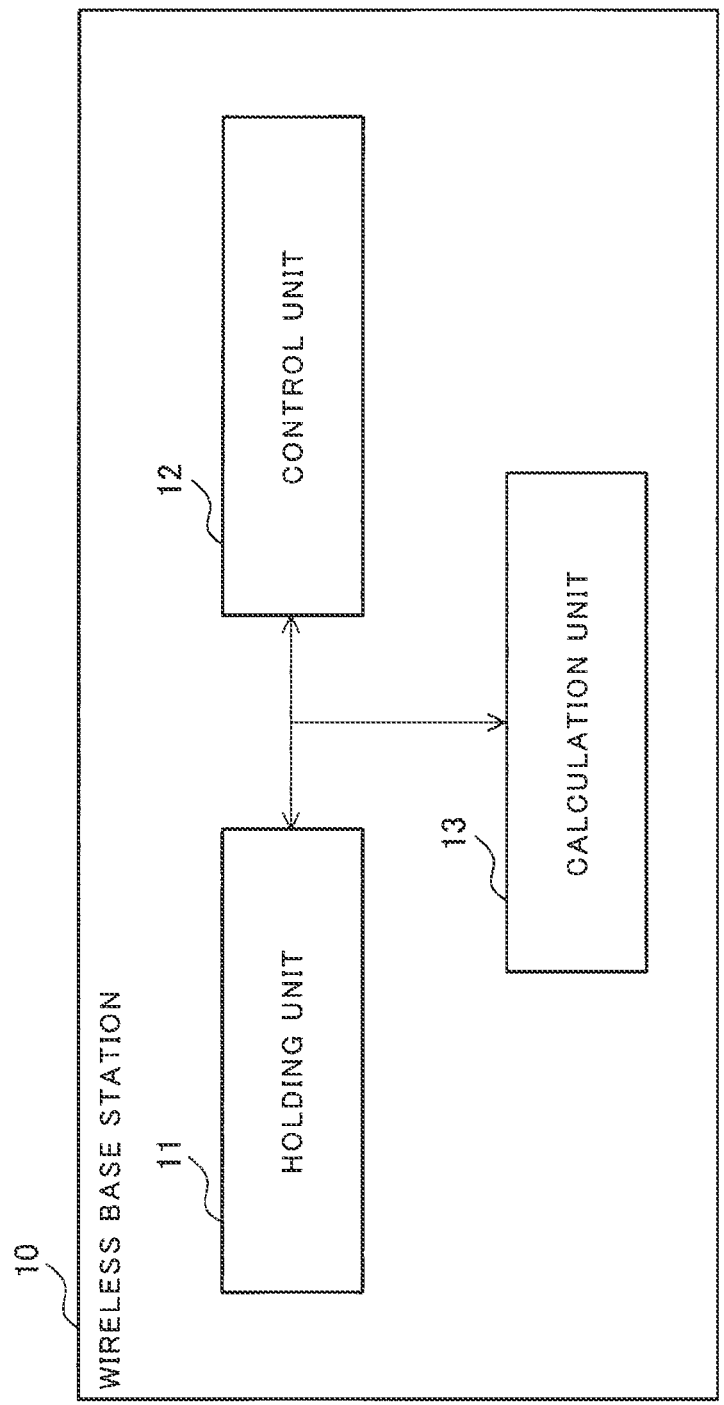
FIG. 4 is a diagram illustrating a configuration of a wireless base station according to a second exemplary embodiment.

Note that calculation of a guaranteed wireless band may be performed by further providing a calculation unit 13 in the wireless base station 10 as illustrated in FIG. 4, and by the calculation unit 13. Alternatively, a guaranteed wireless band calculated by another node (server) connected via a network may be received and held in the wireless base station 10.

The control unit 12 of the wireless base station 10 allocates a wireless band to a UE. When the wireless communication system is an LTE system, the scheduler in the wireless base station performs a process (scheduling) of determining which UE data is allocated to which resource block by which amount.

In allocating a wireless band to a UE, the control unit 12 guarantees allocation of a wireless band up to a guaranteed wireless band to the UE associated with the value of the guaranteed wireless band held in the holding unit 11. Note that a wireless band may change not only by the allotment of radio resources but also by the modulation system or the like. Therefore, it is desirable for the wireless base station to perform scheduling while adjusting the allotment of radio resources to guarantee preferential allocation of a wireless band up to a guaranteed wireless band, taking into consideration a wireless environment of a wireless section or a modulation system. For instance, when the modulation system changes from 64 QAM (Quadrature Amplitude Modulation) to 16 QAM, the number of bits to be transmitted per symbol decreases to two-thirds. Therefore, it is preferable to increase the allotment of radio resources by 1.5 times.

Note that guaranteeing allocation of a wireless band to a UE means that a wireless band up to the guaranteed wireless band is preferentially allocated to the UE. It does not matter whether the actually allocated wireless band reaches the guaranteed wireless band. Further, when the wireless base station is capable of sufficiently allocating a wireless band to a UE, the wireless base station may allocate a wireless band larger than the guaranteed wireless band to the UE.

Note that identification information of UE is information for identifying a UE, an example being IMEI (International Mobile Equipment Identity).

FIG. 3 is a flowchart illustrating an example of an operation of the wireless base station 10 according to the first exemplary embodiment. In the following, an operation of the wireless base station 10 is described referring to FIG. 3.

In allocating a wireless band to a UE, the wireless base station 10 guarantees allocation of a wireless band up to a guaranteed wireless band, wherein the guaranteed wireless band is a wireless band calculated on the basis of a wireless band allocated by the wireless base station 10 in the past, and is a wireless band preferentially allocatable to the UE in allocating a wireless band to a UE (Step S101).

As a specific example of the operation of Step S101, the control unit 12 of the wireless base station 10 notifies the holding unit 11 of a wireless band allocated to a UE in a predetermined interval in the past, together with identification information of the UE. The holding unit 11 calculates a guaranteed wireless band on the basis of the notified wireless band. Then, the holding unit 11 holds the calculated guaranteed wireless band and the notified identification information of the UE in association with each other.

In allocating a wireless band to a UE, the control unit 12 acquires, from the holding unit 11, a guaranteed wireless band associated with identification information of the UE to which a wireless band is allocated. Then, in allocating a wireless band to the UE, the control unit 12 performs scheduling while adjusting the allotment of radio resources so that a wireless band is preferentially allocated up to the acquired guaranteed wireless band.

As described above, calculation of a guaranteed wireless band may be performed by various methods.

Note that when a wireless band is allocated to a UE to which a wireless band has never been allocated by the wireless base station 10 in the past, there is no wireless band for use in calculating a guaranteed wireless band. Therefore, in this case, a wireless band may not be guaranteed, or a predetermined wireless band may be held as a guaranteed wireless band.

Further, in the specific example of the operation of Step S101, calculation of a guaranteed wireless band is described as being performed by the holding unit 11. Alternatively, as described above, a calculation unit additionally provided in the wireless base station 10 may perform the calculation. Further alternatively, a guaranteed wireless band calculated by another node (server) connected via a network may be received and held in the wireless base station 10. Further, as described above, information of a wireless band allocated to a UE in a predetermined interval in the past may be managed by the control unit 12, or may be managed by the holding unit 11. Further, when the calculation is performed by another node (server) connected via a network, information of a wireless band allocated to a UE in a predetermined interval in the past may be managed by the another node, and may be notified to a configuration unit in the another node for performing the calculation.

Note that the details of the exemplary embodiment in which calculation of a guaranteed wireless band, and management of information of a wireless band allocated to a UE in a predetermined interval in the past are performed by another node (server) connected via a network will be described in a fifth exemplary embodiment.

In the first exemplary embodiment, the holding unit 11 of the wireless base station 10 holds a guaranteed wireless band calculated on the basis of a wireless band allocated to a UE in the past. Further, in allocating a wireless band to a UE, the control unit 12 is capable of preferentially allocating a wireless band up to the guaranteed wireless band. Therefore, the wireless base station 10 can guarantee allocation of a predetermined wireless band to a UE, without being affected by a wireless environment in a wireless section. Thus, the wireless base station 10 can stably provide services to predetermined users.

Further, a guaranteed wireless band, which is a wireless band whose allocation is guaranteed by the control unit 12, is calculated on the basis of a wireless band allocated to a UE in the past. Therefore, it is possible to estimate a degree of use of a wireless band by the UE. Thus, it is possible to reduce wasteful consumption of radio resources in a wireless section.

Second Exemplary Embodiment

In the second exemplary embodiment, a holding unit 11 of a wireless base station 10 calculates a guaranteed wireless band in the first exemplary embodiment from a wireless band allocated to a UE in the past, and from a guaranteed wireless band that is preferentially allocatable in allocating a wireless band in the past, with use of a predetermined forgetting coefficient.

FIG. 4 is a diagram illustrating an example of a configuration of a wireless base station according to the second exemplary embodiment.

In FIG. 4, the configuration of the wireless base station in the second exemplary embodiment is further provided with a calculation unit 13 as a calculation means, in addition to the constituent elements of the first exemplary embodiment illustrated in FIG. 1. The calculation unit 13 of the wireless base station 10 calculates a guaranteed wireless band, which is a wireless band preferentially allocatable to a UE. Note that, however, as well as the first exemplary embodiment, the calculation may be performed by a control unit 12, or may be performed by a configuration unit in another wireless base station, or may be performed by another node server) connected to the wireless base station via a network.

Note that a wireless band to be allocated may not always have a fixed value during a predetermined interval.

Therefore, from a viewpoint of providing stable services to users, it is desirable to calculate a guaranteed wireless band on the basis of a peak rate of a wireless band allocated in a predetermined interval. The calculation, however, is not limited to the above. For instance, from a viewpoint of reducing wasteful consumption of radio resources in a wireless section, a guaranteed wireless band may be calculated on the basis of an average value of a wireless band allocated in a predetermined interval.

Further, in the exemplary embodiment, a guaranteed wireless band is calculated on the basis of a wireless band allocated to a UE. Alternatively, it is possible to calculate a guaranteed wireless band on the basis of a wireless band actually used by a UE.

Figure 5:
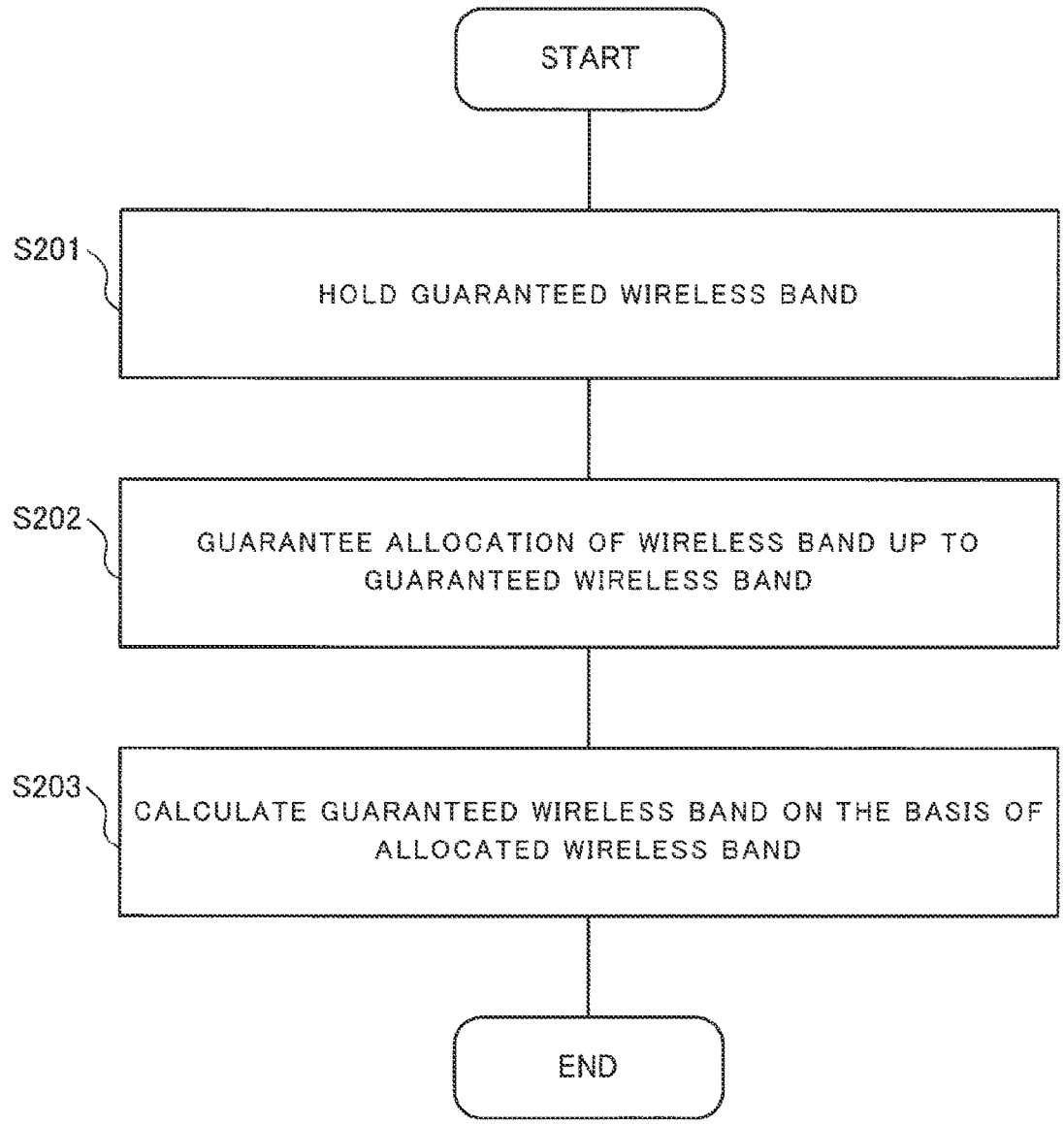
FIG. 5 is a diagram illustrating a flowchart according to the second exemplary embodiment.

FIG. 5 is a flowchart illustrating an example of an operation of the wireless base station 10 according to the second exemplary embodiment. In the following, an operation of the wireless base station 10 is described referring to FIG. 5.

The holding unit 11 of the wireless base station 10 acquires, from the calculation unit 13, a guaranteed wireless band, which is a wireless band calculated on the basis of a wireless band allocated by the wireless base station 10 in the past and preferentially allocatable to a UE, to thereby hold the acquired guaranteed wireless band in association with identification information of the UE (Step S201).

Note that a specific example of calculating a guaranteed wireless band is described in S203.

In allocating a wireless band to a UE, the control unit 12 guarantees allocation of a wireless band up to a guaranteed wireless band to the UE associated with the guaranteed wireless band held by the holding unit 11 (Step S202).

More specifically, in allocating a wireless band to a UE, the control unit 12 acquires, from the holding unit 11, a guaranteed wireless band associated with identification information of the UE to which a wireless band is allocated. Then, in allocating a wireless band to the UE, the control unit 12 performs scheduling while adjusting the allotment of radio resources so that a wireless band is preferentially allocated up to the acquired guaranteed wireless band.

The calculation unit 13 calculates a guaranteed wireless band, which is a wireless band preferentially allocatable to a UE, from a wireless band allocated by the wireless base station 10 in the past, and from a guaranteed wireless band that is preferentially allocatable in allocating a wireless band in the past, with use of a predetermined forgetting coefficient (Step S203).

In the following, a specific example of the operation of S203 is described.

It is assumed that a wireless hand to be allocated to a specific $UE_m$ (m=1, 2, 3, ...) by the wireless base station 10 at the n-th time (n=1, 2, 3, ...) is denoted by $X_{m,n}$, and a guaranteed wireless band, which is a wireless band preferentially allocatable in allocating a wireless band at the n-th time, is denoted by $Y_{m,n}$.

Then, a wireless band allocated to the specific $UE_m$ (m=1, 2, 3, ...) by the wireless base station 10 at the (n−1)-th time is denoted by $X_{m,n-1}$, and a guaranteed wireless band, which is a wireless band that is preferentially allocatable in allocating a wireless band at the (n−1)-th time, is denoted by $Y_{m,n-1}$.

For instance, a wireless band allocated to $UE_1$ by the wireless base station 10 at the third time is denoted by $X_{1,3}$. Further, a guaranteed wireless band, which is a wireless band guaranteed in allocating the wireless band $X_{1,3}$, is denoted by $Y_{1,3}$.

Note that as well as the first exemplary embodiment, a wireless hand $X_{m,n}$ to be allocated to $UE_m$ is a wireless hand to be allocated at a predetermined interval. Further, the predetermined interval is, for instance, a predetermined time interval, or an interval from the time when $UE_m$ starts wireless communication until predetermined data communication is terminated.

In other words, a wireless band allocated to $UE_m$ in the past is a wireless band allocated by the wireless base station 10 prior to the time (at the n-th time) when a wireless band is allocated to $UE_m$, and is a wireless band at one or more predetermined intervals. For instance, a wireless band allocated to $UE_1$ by the wireless base station 10 prior to the time when a wireless band is allocated at the fourth time is at least one or more of $X_{1,3}$, $X_{1,2}$, and $X_{1,1}$.

Next, an example of a method for calculating a guaranteed wireless band in the second exemplary embodiment is described. The holding unit 11 calculates a guaranteed wireless band $Y_{m,n}$ in allocating a wireless band to $UE_m$ at the n-th time, for instance, on the basis of the following equation.

[Eq. 1]

$$Y_{m,2} = X_{m,1} \quad \text{Eq. (1)}$$

[Eq. 2]

$$Y_{m,n} = (1-\alpha) \times X_{m,n-1} + \alpha \times Y_{m,n-1} \quad (n>2, n \text{ is a natural number}) \quad \text{Eq. (2)}$$

Here, in Eq. (2), α represents a forgetting coefficient. Note that in allocating a wireless band to $UE_m$ at the first time, a wireless band may not be guaranteed (best effort mode), or a predetermined initial value may be set and the initial value may be set as a guaranteed wireless band $Y_{m,1}$.

For instance, when $UE_m$ performs wireless communication four times, and wireless bands $X_{1,1}$=10 Mbps, $X_{1,2}$=5 Mbps, $X_{1,3}$=8 Mbps, and $X_{1,4}$=15 Mbps are respectively allocated at the respective times, the value $Y_{m,n}$ at each time is as illustrated in FIG. 6 when it is assumed that the forgetting coefficient α is 0.99.

Note that in the second exemplary embodiment, after allocation of a wireless band to a UE is guaranteed (S202), a guaranteed wireless band is calculated (S203). Alternatively, the operation of S203 may be performed before the operation (S201) of holding a guaranteed wireless band. This is because the wireless base station 10 repeats the operations from S201 to S203, each time the wireless base station 10 allocates a wireless band to a UE.

Further, in the foregoing description, a guaranteed wireless band is calculated by using a guaranteed wireless band at one time in the past. Alternatively, a guaranteed wireless band may be calculated by the following equation, using k forgetting coefficients. The gist of the exemplary embodiment lies in calculating a guaranteed wireless band by using a forgetting coefficient.

[Eq. 3]

$$Y_{m,k+1} = X_{m,k}(n<k) \quad \text{Eq. (3)}$$

[Eq. 4]

$$Y_{m,n} = (1 - \alpha_1 - \ldots - \alpha_k) \times X_{m,n-1} + \alpha_1 \times Y_{m,n-1} + \ldots + \alpha_k \times Y_{m,n-k}$$ ($n \geq k$, $n$ is a natural number) Eq. (4)

In the second exemplary embodiment, the holding unit 11 of the wireless base station 10 calculates a guaranteed wireless band in the first exemplary embodiment from a wireless band allocated to a UE in the past, and from a guaranteed wireless band that is preferentially allocatable in allocating a wireless band in the past, with use of a predetermined forgetting coefficient. Therefore, this makes it possible to flexibly estimate a degree of use of a wireless band by a UE. Thus, it is possible to reduce wasteful consumption of radio resources in a wireless section.

Third Exemplary Embodiment

A wireless base station in the third exemplary embodiment holds the number of times of accesses to the wireless base station by a UE in association with identification information of the UE, and determines the preferential order of UE of preferentially guaranteeing allocation of a wireless band depending on the number of times of accesses.

The configuration of a wireless base station 10 according to the third exemplary embodiment is the same as the configuration of the wireless base station according to the second exemplary embodiment. Alternatively, the wireless base station according to the first exemplary embodiment may be used. In this case, calculation of a guaranteed wireless band may be performed by a holding unit 11 or by another node (server) connected via a network, and the calculated guaranteed wireless band may be received and held in the wireless base station 10.

The holding unit 11 of the wireless base station 10 holds the number of times of accesses to the wireless base station 10 by a UE in association with identification information of the LIE, in addition to the guaranteed wireless band held in the first or second exemplary embodiment. The holding unit 11 determines the preferential order of UE of preferentially guaranteeing allocation of a wireless band depending on the number of times of accesses (see FIG. 7).

Note that the number of times of accesses to the wireless base station 10 is, for instance, the number of times of establishing an RRC (Radio Resource Control) connection between a UE and the wireless base station 10. The present invention, however, is not limited to the above.

A control unit 12 preferentially guarantees allocation of a wireless band only to a predetermined UE on the basis of the preferential order determined by the holding unit 11.

Note that determination of the preferential order of UE of preferentially guaranteeing allocation of a wireless band is performed by the holding unit 11. Alternatively, a determination unit may be provided in the wireless base station 10, and the determination unit may perform the determination. Further alternatively, the wireless base station 10 may receive and hold the preferential order of UE determined by another node (server) connected via a network.

Figures 7, 8:
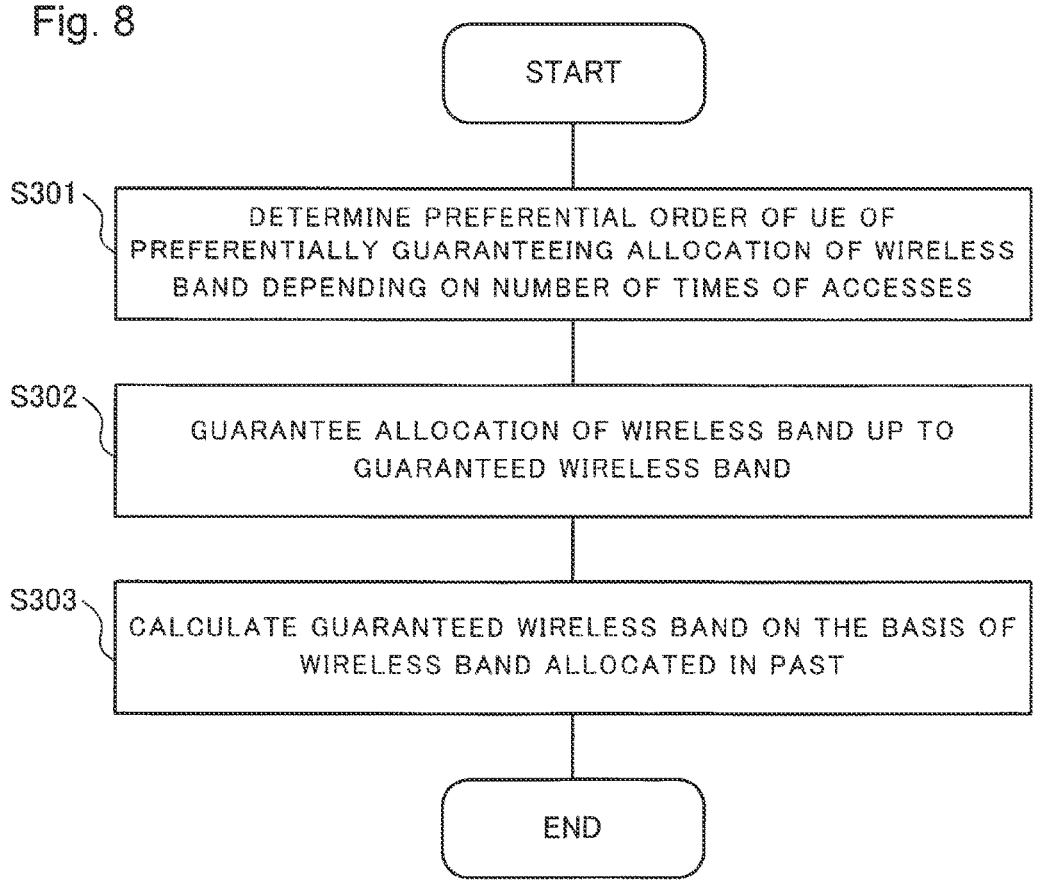
FIG. 7 is a diagram illustrating an example of a holding table according to a third exemplary embodiment.
FIG. 8 is a diagram illustrating a flowchart according to the third exemplary embodiment.

FIG. 8 is a flowchart illustrating an example of an operation of the wireless base station 10 according to the third exemplary embodiment. In the following, an operation of the wireless base station 10 is described referring to FIG. 8.

The holding unit 11 of the wireless base station 10 holds the number of times of accesses to the wireless base station 10 by a UE in association with identification information of the UE, in addition to a guaranteed wireless band, and determines the preferential order of UE of preferentially allocating a wireless band depending on the number of times of accesses (Step S301).

Specifically, the holding unit 11 judges whether identification information of UE is stored in a list (see FIG. 7) provided in the holding unit 11 when a UE accesses the wireless base station 10. When it is judged that identification information is not stored, the holding unit 11 newly adds identification information of the UE in the list, and adds +1 to the value in the column indicating the number of times of accesses, which is associated with identification information of the UE. When it is judged that identification information is stored, the holding unit 11 adds +1 to the value in the column indicating the number of times of accesses, which is associated with identification information of the UE.

Note that when identification information of UE is newly added in the list, 0 Mbps (best effort mode) or a predetermined initial value is set as a value in the column indicating a guaranteed wireless band, which is associated with the UE.

Then, the holding unit 11 determines the preferential order of UE of preferentially allocating a wireless band in the descending order of the number of times of accesses, for instance.

Note that it is difficult to guarantee allocation of a wireless band to all the UEs, because the radio resources in a wireless section are limited. In view of the above, it is desirable to set a predetermined threshold value for the preferential order of UE to guarantee allocation of a wireless band only to a specific UE. The predetermined threshold value may be a fixed value, or may be changed according to a state of use of radio resources in a wireless section. Changing a predetermined threshold value on the basis of a state of use of radio resources makes it possible to suppress shortage of radio resources.

Subsequently, in allocating a wireless band to a UE, the control unit 12 of the wireless base station 10 guarantees allocation of a wireless band up to the guaranteed wireless band to a predetermined UE according to the determined preferential order (Step S302).

Then, the calculation unit 13 calculates a guaranteed wireless band to a UE from a wireless band allocated by the wireless base station 10 in the past, and from a guaranteed wireless band that is preferentially allocatable in allocating a wireless band in the past, with use of a predetermined forgetting coefficient (Step S303).

Note that the method for calculating a guaranteed wireless band is the same as the method described in the first or second exemplary embodiment. Therefore, description of the calculation method is omitted herein.

Further, in the third exemplary embodiment, after allocation of a wireless band to a UE is guaranteed (S302), a guaranteed wireless band is calculated (S303). Alternatively, the operation of S303 may be performed before S301. This is because the wireless base station 10 repeats the operations from S301 to S303, each time the wireless base station 10 allocates a wireless band to a UE. When the operation of S303 is performed before S301, a column for holding a wireless band allocated in the past, and a guaranteed wireless band in the past may be provided in place of or in addition to the column for holding a guaranteed wireless band in the holding table illustrated in FIG. 7. This is because, as described above, a wireless band allocated in the past and a guaranteed wireless band in the past are necessary for calculation of a guaranteed wireless band.

In the third exemplary embodiment, the holding unit 11 of the wireless base station 10 is configured to hold the number of times of accesses to the wireless base station 10 by a UE in association with identification information of the UE, in addition to a calculated guaranteed wireless band, and to determine the preferential order of UE of preferentially allocating a wireless band depending on the number of times of accesses. Then, the control unit 12 guarantees allocation of a wireless band to a predetermined UE according to the determined preferential order. This makes it possible to preferentially handle a predetermined UE.

Note that in the third exemplary embodiment, the preferential order of UE is determined depending on the number of times of accesses. Alternatively, the preferential order of UE may be determined depending on a calculated guaranteed wireless band. Further alternatively, the preferential order may be determined depending on both of the number of times of accesses and a guaranteed wireless band. For instance, the preferential order of UE may be determined from the larger number of times of accesses, and in the ascending order of the calculated guaranteed wireless bands. This makes it possible to preferentially handle users who frequently use the system, and makes it possible to prevent occupation of radio resources by a specific user.

Fourth Exemplary Embodiment

A wireless base station in the fourth exemplary embodiment holds a guaranteed wireless band and the number of times of accesses for each predetermined time zone, and changes the preferential order of UE of preferentially guaranteeing allocation of a wireless band for each predetermined time zone.

The configuration of a wireless base station 10 according to the fourth exemplary embodiment is the same as the configuration of the wireless base station according to the second exemplary embodiment. Alternatively, the wireless base station according to the first exemplary embodiment may be used. In this case, calculation of a guaranteed wireless band may be performed by a holding unit 11, or by another node (server) connected via a network, and the calculated guaranteed wireless band may be received and held in the wireless base station 10.

The holding unit 11 of the wireless base station 10 holds identification information of a UE, a guaranteed wireless band for use in preferentially allocating a wireless band to the UE, and the number of times of accesses to the wireless base station 10 by the UE for each predetermined time zone. For instance, the holding unit 11 may be provided with a plurality of tables, in each of which information of UE is accumulated every one hour, as illustrated in FIG. 9.

In allocating a wireless band to a UE, a control unit 12 acquires, from a time zone table associated with a time at which a wireless band is allocated, a preferential order of UE on the basis of the number of times of accesses stored in the holding unit 11, and a guaranteed wireless band for use in preferentially allocating a wireless band to the UE. Then, the control unit 12 guarantees preferential allocation of a wireless band to a predetermined UE on the basis of the acquired information.

FIG. 10 is a flowchart illustrating an example of an operation of the wireless base station 10 according to the fourth exemplary embodiment. In the following, an operation of the wireless base station 10 is described referring to FIG. 10.

In response to an access from a UE to the wireless base station, the holding unit 11 of the wireless base station 10 searches a table associated with a predetermined time zone to which the access time belongs (Step S401).

Subsequently, within the searched table, the number of times of accesses to the wireless base station 10 by the UE is added to the column for holding the number of times of accesses associated with identification information of the UE (Step S402). Then, the holding unit 11 determines the preferential order of UE of preferentially allocating a wireless band in the predetermined time zone depending on the number of times of accesses (Step S403).

Note that the specific operations of S402 and S403 in the predetermined time zone are the same as the operation of Step S301 in the third exemplary embodiment, and therefore, description of the specific operations is omitted herein.

In allocating a wireless band to a UE, the control unit 12 guarantees allocation of a wireless band to a predetermined UE up to the guaranteed wireless band according to the preferential order determined in the table associated with the time zone to which the access time of the UE to the wireless base station 10 belongs (Step S404).

Then, the calculation unit 13 calculates a guaranteed wireless band of the UE from a wireless band allocated by the wireless base station 10 in the past, and from a guaranteed wireless band that is preferentially allocatable in allocating a wireless band in the past, with use of a predetermined forgetting coefficient (Step S405).

Note that the method for calculating a guaranteed wireless band is the same as the method described in the first or second exemplary embodiment. Therefore, description of the calculation method is omitted herein.

Further, similar to the third exemplary embodiment, it is desirable to set a predetermined threshold value for the preferential order of UE to guarantee allocation of a wireless band only to a specific UE. The predetermined threshold value may be a fixed value, or may be changed depending on a state of use of radio resources in a wireless section, for instance. Changing a predetermined threshold value on the basis of a state of use of radio resources makes it possible to suppress shortage of radio resources.

In the fourth exemplary embodiment, a guaranteed wireless band and the number of times of accesses are held for each predetermined time zone to change the preferential order of UE of preferentially guaranteeing allocation of a wireless band for each predetermined time zone. Therefore, this makes it possible to preferentially guarantee allocation of a wireless band among different UEs depending on a predetermined time zone. This is particularly advantageous, for instance, when wireless communication is performed in an area where a specific user frequently uses in a specific time zone, for instance, when wireless communication is performed between a user, and a wireless base station including a commute route/school route in the cell of the wireless base station via a UE.

Fifth Exemplary Embodiment

In the first to fourth exemplary embodiments, a configuration unit in a wireless base station is controlled to calculate a guaranteed wireless band, which is a wireless band for use in guaranteeing preferential allocation to a UE, so that a wireless band is preferentially allocatable to the UE up to the calculated guaranteed wireless band. In the fifth exemplary embodiment, calculation of the guaranteed wireless band is performed by another node (server) connected to a wireless base station via a network.

Figure 11:
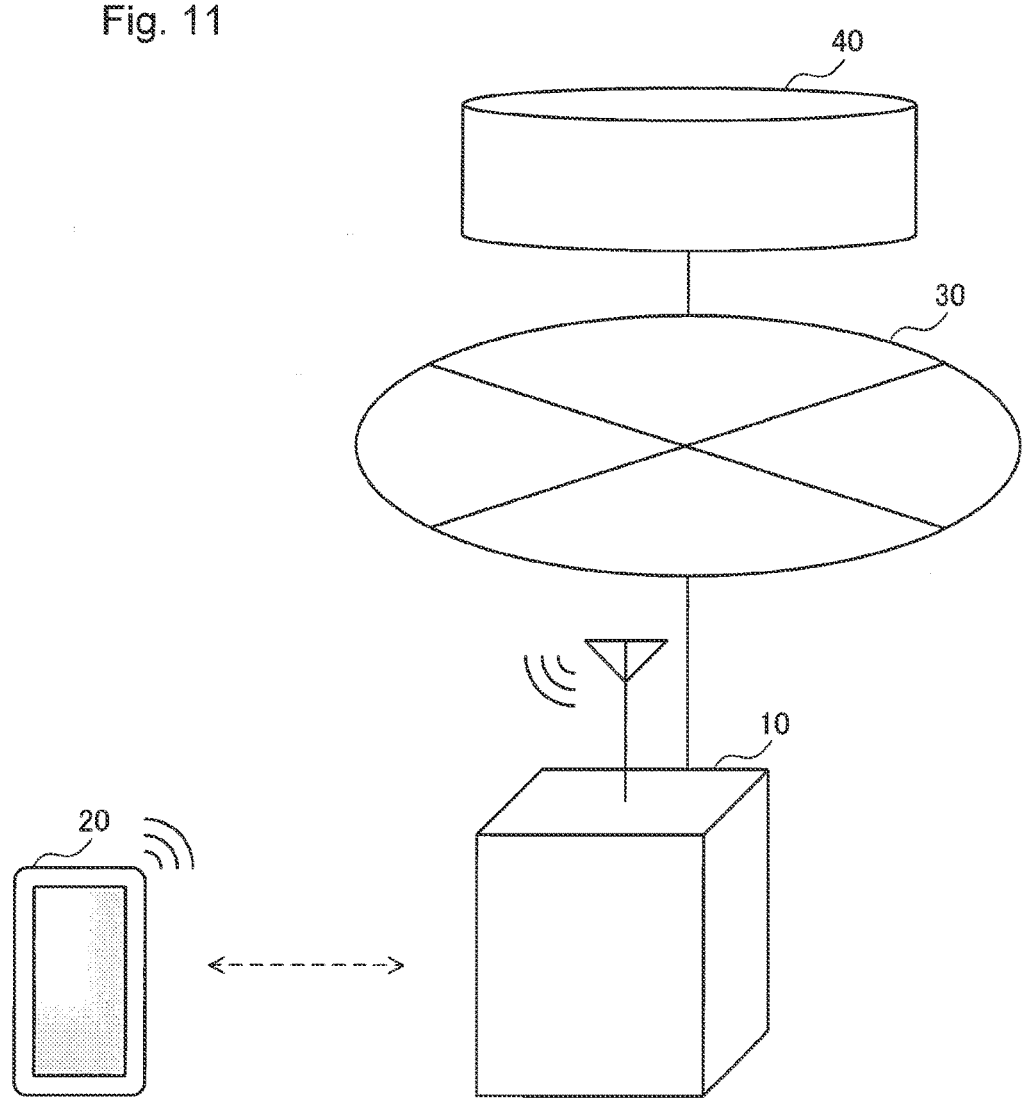
FIG. 11 is a diagram illustrating a configuration of a wireless communication network according to a fifth exemplary embodiment.

FIG. 11 illustrates a configuration of a wireless communication network in the exemplary embodiment. A wireless base station 10 is wirelessly and communicatively connected to a UE 20. Further, the wireless base station 10 is also communicatively connected to a predetermined node 40 via a predetermined network 30. The node 40 may be an RNC (Radio Network Controller), for example, in a wireless communication network according to a CDMA (Code Division Multiple Access) system. Further, when an LTE (Long Term Evolution) system is employed, the network 30 may employ an EPC (Evolved Packet Core) network system, and the node 40 may be an MME (Mobility Management Entity) or an SAE-GW (System Architecture Evolution-Gateway). Note that the node 40 and the network 30 are not limited to the aforementioned configurations. For instance, the node 40 may be another device provided in a core network. Further, when FIG. 11 is a diagram in which illustration of an element such as a core network is omitted, the network 30 may be configured as an IP (Internet Protocol) network, and the node 40 may be configured as a server provided in the IP network.

Figure 12:
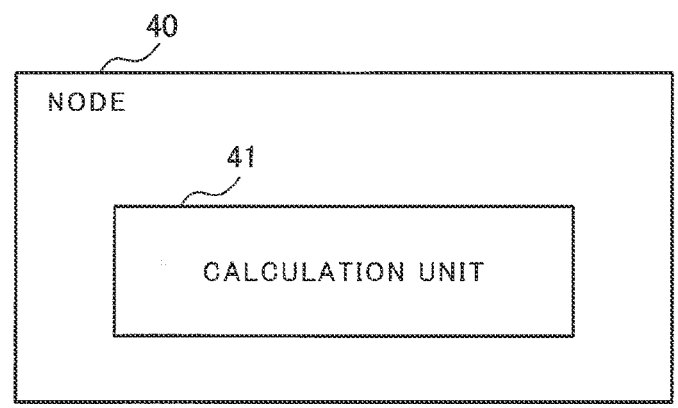
FIG. 12 is a diagram illustrating a configuration of a node according to the fifth exemplary embodiment.

FIG. 12 is a diagram illustrating an example of a configuration of the node 40 according to the fifth exemplary embodiment.

FIG. 12 illustrates only the constituent elements particularly associated with the exemplary embodiment among the functional blocks included in the node 40. Specifically, although not illustrated, the node 40 includes functional blocks for causing the node 40 to function as an MME system provided in a core network, or as a server provided in an IP network.

A calculation unit 41 of the node 40 calculates a guaranteed wireless band, which is a wireless band preferentially allocatable to the UE 20 by the wireless base station 10.

Note that calculation of a guaranteed wireless band may be performed by various methods. Since calculation of a guaranteed wireless band is described in the first exemplary embodiment and in the second exemplary embodiment, description thereof is omitted herein.

Figure 13:
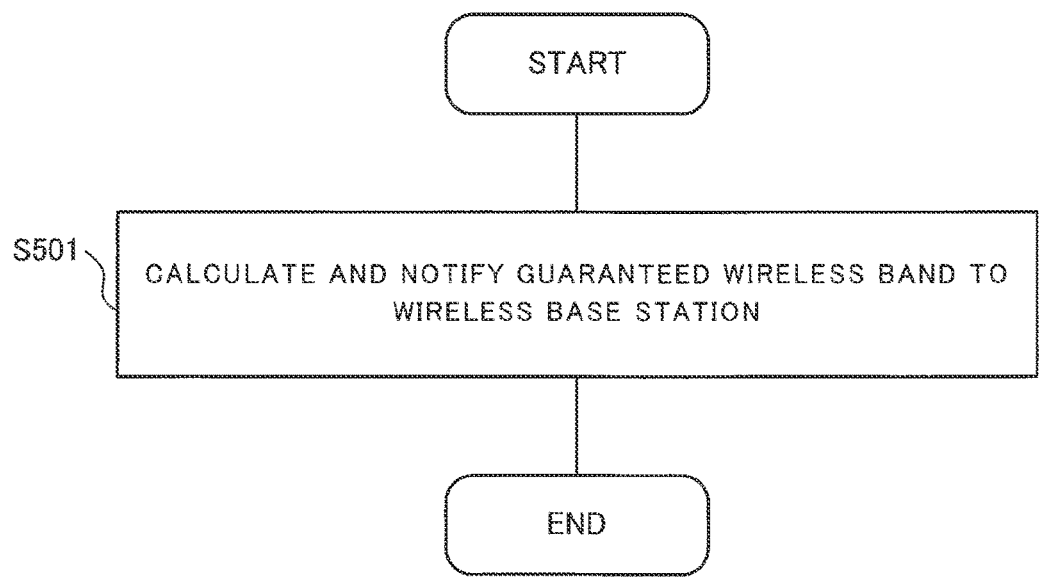
FIG. 13 is a diagram illustrating a flowchart according to the fifth exemplary embodiment.

FIG. 13 is a flowchart illustrating an example of an operation of the node 40 according to the fifth exemplary embodiment. In the following, an operation of the node 40 is described referring to FIG. 13.

The calculation unit 41 of the node 40 receives a wireless band actually allocated to the UE 20 from the wireless base station 10 via the network 30, calculates a guaranteed wireless band on the basis of the received wireless band, and notifies the calculated guaranteed wireless band to the wireless base station 10 (Step S501).

A detailed example of Step S501 is described. The node 40 receives information of a wireless band, which is transmitted from the wireless base station 10 with use of a predetermined protocol, after allocation of a wireless band to the UE 20 by the wireless base station 10 is terminated. In this case, the holding table provided in the holding unit 11 of the wireless base station 10 in the third or fourth exemplary embodiment may be provided in the node, and the wireless band may be held in association with identification information of the UE 20. Then, the calculation unit 41 calculates a guaranteed wireless band, which is a wireless band preferentially allocatable to the UE 20, from a received wireless band, and from a guaranteed wireless band that is preferentially allocatable in allocating the wireless band by the wireless base station 10, with use of a predetermined forgetting coefficient. The node 40 notifies the calculated guaranteed wireless band to the wireless base station 10 together with identification information of the UE 20.

Thereafter, the wireless base station 10, for instance, as described in the first exemplary embodiment, a control unit provided in a wireless base station preferentially guarantees allocation of a wireless band to the UE 20 up to the notified guaranteed wireless band.

Note that as far as the timing of receiving, by the node 40, a wireless band allocated to the UE 20 by the wireless base station 10 from the wireless base station 10 is after completion of allocation of a wireless band to the UE 20, the timing may be immediately after the completion, or at a time when the wireless base station 10 allocates a wireless band to the UE 20 next time.

In the latter case, in allocating a wireless band to the UE 20, the wireless base station 10 may request the node 40 to notify a guaranteed wireless band from the node 40 to the wireless base station 10.

Further, in the exemplary embodiment, the node 40 connected to the wireless base station 10 via the network 30 performs management of information of a wireless band and calculation of a guaranteed wireless band. Alternatively, an existing wireless base station 10 may be provided with the calculation unit 41 of the exemplary embodiment.

In the exemplary embodiment, a node outside of a wireless base station performs management of information of a wireless band and calculation of a guaranteed wireless band, and notifies the calculated guaranteed wireless band to the wireless base station. Thus, the present invention is applicable without updating the facility of an existing wireless base station.

Further, the aforementioned wireless base station can be implemented by hardware components, software components, or combination of these components. Furthermore, the method for controlling a wireless base station can be implemented by hardware components, software components, or combination of these components. Note that implementation by software components means implementation by causing a computer to read a program to execute the program.

A program is stored with use of various types of non-transitory computer-readable media, and can be supplied to a computer. The non-transitory computer-readable media include various types of tangible storage media.

Examples of the non-transitory computer readable media include a magnetic recording medium (e.g. a flexible disk, a magnetic tape, and a hard disk drive), and a magneto-optical recording medium (e.g. a magneto-optical disk). Further examples of the non-transitory computer-readable media include a CD-ROM (Compact Disc-Read Only Memory), a CD-R, a CD-R/W, a DVD-ROM (Digital Versatile Disc-ROM), a DVD-R, and a DVD-R/W. Furthermore examples of the non-transitory computer-readable media include a semiconductor memory (e.g. a mask ROM, a PROM (Programmable ROM), and an EPROM (Erasable PROM)), a flash ROM, and an RAM (Random Access Memory).

Further, the program may be supplied to a computer by a variety of types of transitory computer-readable media. Examples of the transitory computer-readable media include an electrical signal, an optical signal, and an electromagnetic wave. The transitory computer-readable media can supply a program to a computer via a wired communication path such as a cable and an optical fiber, or via a wireless communication path.

Further, the aforementioned exemplary embodiments may be implemented by combination of the exemplary embodiments as necessary. Further, the present invention is not limited to the aforementioned exemplary embodiments, and may be implemented in various ways.

The whole or part of exemplary embodiments disclosed above can be described as, but not limited to, the following supplementary notes.

(Supplementary Note 1)

A wireless base station, which performs wireless communication with the wireless terminal, comprising:

a holding means which holds a guaranteed wireless band in association with identification information of a wireless terminal, the guaranteed wireless band being a wireless band calculated on the basis of a wireless band allocated to the wireless terminal by the wireless base station in the past, and preferentially allocatable to the wireless terminal; and a control means which controls to preferentially allocate, to the wireless terminal, a wireless band up to the guaranteed wireless band.

(Supplementary Note 2)

The wireless base station according to Supplementary Note 1, wherein the holding means holds the guaranteed wireless band which is a wireless band preferentially allocatable to the wireless terminal, the guaranteed wireless band being calculated from a wireless band allocated to the wireless terminal in the past and a guaranteed wireless band that is preferentially allocatable in allocating a wireless band in the past, with use of a predetermined forgetting coefficient.

(Supplementary Note 3)

The wireless base station according to Supplementary Note 1 or 2, further comprising:

a calculation means which calculates the guaranteed wireless band.

(Supplementary Note 4)

The wireless base station according to any one of Supplementary Notes 1 to 3, wherein the holding means further holds the number of times of accesses to the wireless base station by the wireless terminal in association with the identification information of the wireless terminal, a preferential order of the wireless terminal of preferentially allocating a wireless band is determined depending on the number of times of accesses, and the control means can preferentially allocate, to a predetermined wireless terminal, a wireless band up to the guaranteed wireless band on the basis of the preferential order.

(Supplementary Note 5)

The wireless base station according to Supplementary Note 4, wherein the holding means holds the number of times of accesses to the wireless base station by the wireless terminal for each predetermined time zone, and changes the preferential order of the wireless terminal depending on the predetermined time zone.

(Supplementary Note 6)

The wireless base station according to any one of Supplementary Notes 1 to 3, wherein the holding means determines the preferential order of the wireless terminal of preferentially allocating a wireless band depending on a value of the guaranteed wireless band, and the control means can preferentially allocate, to the predetermined wireless terminal, a wireless band up to the guaranteed wireless band on the basis of the preferential order.

(Supplementary Note 7)

The wireless base station according to Supplementary Note 6, wherein the holding means holds the guaranteed wireless band for each predetermined time zone, and changes the preferential order of the wireless terminal depending on the predetermined time zone.

(Supplementary Note 8)

The wireless base station according to any one of Supplementary Notes 3 to 7, wherein the holding means determines the preferential order of the wireless terminal according to a state of allocating a wireless band to the wireless terminal by the wireless base station.

(Supplementary Note 9)

A communication system, which comprises a wireless terminal, a wireless base station which performs wireless communication with the wireless terminal, and a node to be connected to the wireless base station via a network, wherein the node receives, from the wireless base station, a wireless band allocated to the wireless terminal by the wireless base station in the past, calculates a guaranteed wireless band which is a wireless band preferentially allocatable to the wireless terminal on the basis of the wireless band allocated in the past, and notifies the calculated guaranteed wireless band to the wireless base station, and the wireless base station holds the guaranteed wireless band received from the node in association with identification information of the wireless terminal, and controls to preferentially allocate, to the wireless terminal, a wireless band up to the guaranteed wireless band.

(Supplementary Note 10)

A node to be connected to the wireless base station, which performs wireless communication with the wireless terminal, via, a network, configured to:

receive, from a wireless base station, a wireless band allocated to a wireless terminal by the wireless base station in the past;

calculate a guaranteed wireless band which is a wireless band preferentially allocatable to the wireless terminal on the basis of a wireless band allocated in the past; and notify the calculated guaranteed wireless band to the wireless base station.

(Supplementary Note 11)

A method for controlling a wireless base station, which performs wireless communication with the wireless terminal, comprising:

controlling to preferentially allocate a wireless band to a wireless terminal up to a guaranteed wireless band which is a wireless band preferentially allocatable to the wireless terminal, the guaranteed wireless band calculated on the basis of a wireless band allocated to the wireless terminal in the past by the wireless base station.

(Supplementary Note 12)

A method for controlling a node to be connected to a wireless base station which performs wireless communication with a wireless terminal via a network, the node control method comprising:

calculating a guaranteed wireless band on the basis of a wireless band allocated to the wireless terminal by the wireless base station in the past, the guaranteed wireless band being a wireless band preferentially allocatable to the wireless terminal by the wireless base station; and notifying the calculated guaranteed wireless band to the wireless base station.

(Supplementary Note 13)

A program causing a computer to execute a method for controlling a wireless base station, which performs wireless communication with the wireless terminal, wherein the computer executes the method for controlling the wireless base station, in which a control is performed to preferentially allocate, to a wireless terminal, a wireless band up to a guaranteed wireless band being a wireless band preferentially allocatable to the wireless terminal, the guaranteed wireless band being calculated on the basis of a wireless band allocated to the wireless terminal by the wireless base station in the past.

(Supplementary Note 14)

A program causing a computer to execute a method for controlling a node to be connected to a wireless base station which performs wireless communication with a wireless terminal via a network, the program causing the computer to execute the node control method of:

calculating a guaranteed wireless band on the basis of a wireless band allocated to the wireless terminal by the wireless base station in the past, the guaranteed wireless band being a wireless band preferentially allocatable to the wireless terminal by the wireless base station; and notifying the calculated guaranteed wireless band to the wireless base station.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2013-253831, filed on Dec. 9, 2013, the disclosure of which is incorporated herein in its entirety by reference.

REFERENCE SIGNS LIST

10 Wireless base station
11 Holding unit
12 Control unit
13 Calculation unit
20 UE
30 Network
40 Node
41 Calculation unit

The invention claimed is:

1. A wireless base station comprising:
a memory which holds a guaranteed wireless band in association with identification information of a wireless terminal, the guaranteed wireless band being a wireless band calculated on the basis of a wireless band allocated to the wireless terminal by the wireless base station in the past, and allocatable to the wireless terminal in preference to other wireless terminals; and
a control unit which controls to allocate, to the wireless terminal in preference to other wireless terminal, a wireless band up to the guaranteed wireless band, wherein
the memory further holds the number of times of accesses to the wireless base station by the wireless terminal in association with the identification information of the wireless terminal,
a preferential order of the wireless terminal of preferentially allocating a wireless band is determined depending on the number of times of accesses, and
the control unit can preferentially allocate, to a predetermined wireless terminal, a wireless band up to the guaranteed wireless band on the basis of the preferential order.

2. The wireless base station according to claim 1, wherein the memory holds the number of times of accesses to the wireless base station by the wireless terminal for each predetermined time zone, and changes the preferential order of the wireless terminal depending on the predetermined time zone.

3. The wireless base station according to claim 1, wherein the memory determines the preferential order of the wireless terminal according to a state of allocating a wireless band to the wireless terminal by the wireless base station.

4. A communication system comprising:
a wireless terminal;
a wireless base station which performs wireless communication with the wireless terminal; and
a node to be connected to the wireless base station via a network, wherein
the node
receives, from the wireless base station, a wireless band allocated to the wireless terminal by the wireless base station in the past, calculates a guaranteed wireless band which is a wireless band allocatable to the wireless terminal in preference to other wireless terminals on the basis of the wireless band allocated in the past, and notifies the calculated guaranteed wireless band to the wireless base station, and
the wireless base station
holds the guaranteed wireless band received from the node in association with identification information of the wireless terminal, controls to allocate, to the wireless terminal in preference to other wireless terminals, a wireless band up to the guaranteed wireless band, holds the number of times of accesses to the wireless base station by the wireless terminal in association with the identification information of the wireless terminal, determines a preferential order of the wireless terminal of preferentially allocating a wireless band depending on the number of time of accesses, and can preferentially allocate, to a predetermined wireless terminal, a wireless band up to the guaranteed wireless band on the basis of the preferential order.

5. A node configured to:
receive, from a wireless base station, a wireless band allocated to a wireless terminal by the wireless base station in the past;
calculate a guaranteed wireless band which is a wireless band allocatable to the wireless terminal in preference to other wireless terminals on the basis of a wireless band allocated in the past;
determine a preferential order of the wireless terminal of preferentially allocating a wireless band depending on the number of times of accesses to the wireless base station by the wireless terminal; and
notify the calculated guaranteed wireless band to the wireless base station.

* * * * *